United States Patent [19]
Yamashita et al.

[11] Patent Number: 6,124,657
[45] Date of Patent: Sep. 26, 2000

[54] MOTOR HAVING A HYDRODYNAMIC BEARING AND COOLING DEVICE USING THE MOTOR

[75] Inventors: Akitomo Yamashita; Eiichiro Nakazono, both of Usa, Japan

[73] Assignee: Matsushita Electric Industrial Co., Ltd., Osaka, Japan

[21] Appl. No.: 09/258,269

[22] Filed: Feb. 26, 1999

[30] Foreign Application Priority Data

Feb. 27, 1998 [JP] Japan .................................. 10-046969

[51] Int. Cl.⁷ .......................... H02K 05/16; F16C 17/02
[52] U.S. Cl. ............................................. 310/90; 384/107
[58] Field of Search ............................ 310/90, 91, 67 R; 29/596, 598, 597; 384/115, 118, 114, 111, 113, 107

[56] References Cited

U.S. PATENT DOCUMENTS

| | | | |
|---|---|---|---|
| 4,781,476 | 11/1988 | Uhen | 384/136 |
| 5,427,456 | 6/1995 | Hensel | 384/112 |
| 5,698,925 | 12/1997 | Coupart | 310/217 |
| 5,810,480 | 9/1998 | Asada et al. | 384/107 |

FOREIGN PATENT DOCUMENTS 63-58283 11/1988 Japan .
7-1528 1/1995 Japan .

*Primary Examiner*—Elvin Enad
*Assistant Examiner*—Tran N Nguyen
*Attorney, Agent, or Firm*—Wenderoth, Lind & Ponack, L.L.P.

[57] ABSTRACT

A long service-life motor free from oil-spill from its bearing is achieved by a construction including the following elements: a frame having an opening, a housing disposed on the frame and having one side thereof open, a stator secured to the housing, a sleeve situated in the housing and having an inner wall extending straight in its axial direction, a rotary shaft extending through the sleeve and being rotatably supported by the sleeve, an annular recess formed on part of the shaft and facing the inner wall of the sleeve, a tapered section of the shaft end facing a bottom face of the housing, a rotor having a magnet opposite to the stator, and oil lubricated in a space between the shaft and the sleeve, and pooled in the groove as well as in another space formed by the tapered section, the bottom face of the housing and the sleeve. This construction allows the bearing to be downsized and also processed with ease. This motor enables a cooling device to be smaller in size and to operate more efficiently at a lower noise level.

21 Claims, 5 Drawing Sheets

MOTOR HAVING A HYDRODYNAMIC BEARING AND COOLING DEVICE USING THE MOTOR

FIELD OF THE INVENTION

The present invention generally relates to a motor having a dynamic-pressure-fluid-bearing, and more particularly to a cooling device using the motor for efficiently cooling e.g. semiconductor devices.

BACKGROUND OF THE INVENTION

FIG. 4 is a cross section depicting a structure of a conventional cooling device employing a motor having a dynamic-pressure-fluid-bearing. FIG. 5 is a cross section of a motor-bearing employed in the cooling device of FIG. 4.

A structure of the prior art is described hereinafter with reference to FIG. 4 and FIG. 5.

Housing 141 having one open side and being cup shaped is protrusively formed on a recess of frame 101. Housing 141 secures stator 103 on its outer wall, and stator 103 is wound with coil 102. Driving circuit substrate 104 is disposed around housing 141. Substrate 104 holds stator 103 and connects electrically a terminal of coil 102 to a wiring formed on substrate 104 by soldering. Substrate 104 is equipped with electronic components constituting the driving circuit and Hall elements. Insulating sheet 120 is disposed between substrate 104 and frame 101.

Frame 101 is surrounded by a side wall and has an upward opening. Bell-mouth 119 is disposed around the opening to promote airflow. Thrust plate 107 made of resin is disposed on a bottom face of housing 141. Sleeve 105 is fit into housing 141. Stator unit 115 comprises these elements discussed above, i.e. frame 101, housing 141, sleeve 105, coil 102 and stator 103.

Rotary shaft 109 extends through sleeve 105 and is axially underpinned by thrust plate 107 as well being rotatably supported by sleeve 105. Fan 108 is mounted to shaft 109. Magnet 111 is bonded to fan 108 via magnet yoke 112 so that magnet 111 faces stator 103. Rotor 116 comprises the elements discussed above, i.e. magnet 111, yoke 112 and fan 108.

The bearing of the motor is detailed hereinafter with reference to FIG. 5.

In FIG. 5, sleeve 105 is equipped with oil reservoir 147 near the center of its inner wall. Oil reservoir 147 has a greater inner diameter than other parts of the inner wall of sleeve 105. Sleeve 105 has dynamic-pressure-generating grooves 113 on both sides of oil reservoir 147. Grooves 113 are formed by a ball-rolling-process. Oil 114 is provided to grooves 113 for sleeve 105 and shaft 109. Radial bearing 117 is thus formed as discussed above.

The tip of shaft 109 facing thrust plate 107 is processed into a spherical face that contacts thrust plate 107 so that thrust plate 107 supports shaft 109 axially. A thrust support 106 independent of frame 101 supports the thrust plate 107. Thrust bearing 118 is thus structured as discussed above.

Reference number 300 represent a heating load on the cooling device positioned on a face of the cooling device opposite to the face of the frame forming the recess.

The conventional motor employing this dynamic-pressure-fluid-bearing, however, has the following problems.

Electronic apparatuses including personal computers and electric home appliances have been downsized in recent years, which entails requiring cooling-fan-motors, one of the components of the apparatuses and appliances, to be smaller and slimmer. In order to meet this requirement, a bearing space is narrowed, which forces the outer diameter of rotary shaft 109 and inner diameter of sleeve 105 to be narrowed.

In the prior art, since a bite shank having ca. 2 mm diameter has been used in processing the bearing, oil reservoir 147 can be processed with regard to sleeve 105 having over 3 mm inner diameter. However, when sleeve 105 is downsized to have not more than 2 mm inner diameter, the bite shank must have a diameter not more than 1 mm in order to form the oil reservoir. The shank having a diameter not more than 1 mm encounters abnormal vibrations due to the narrowed body when the sleeve is processed, and is broken frequently. If the process speed is slowed down to avoid this breakage, process time increases, which boosts the manufacturing cost. Narrowing of the inner diameter of the sleeve has thus been at a standstill from the standpoint of processing.

Apparatuses and appliances which are equipped with more functions and have undergone the downsizing process are obliged to liberate a greater heating value. The cooling-fan-motor mounted in these apparatuses and appliances experiences significant temperature changes, and is forced to drive at a high rotational speed in order to promote cooling efficiency.

Oil 114 provided between shaft 109 and sleeve 105 produces surface tension, and oil 114 retained in dynamic-pressure-grooves is moved along the grooves to the centers thereof by the spin of shaft 109, thereby producing a pumping force.

The high rotational speed increases the centrifugal force and the temperature changes widely, which increases expansion and contraction of oil 114 per se, and air entrapped in the oil 114. Due to these expansions and contractions, oil 114 overflows the bearing and travels along shaft 109 and rotor 116 to the outside of the motor. Due to this oil-spill, abnormalities are found such as an oil shortage at the bearing, a lower number of rotations, increased electric current, abnormal sounds, and further, a locked rotor.

SUMMARY OF THE INVENTION

The present invention addresses the problems discussed above, and aims to provide a motor free from oil-spill from its bearing during operation, and also provide a cooling device using the same motor for achieving efficient cooling.

The motor of the present invention comprises the following elements:

(a) a frame having an opening;
(b) a housing formed on the frame and having one side thereof open;
(c) a stator secured on an outer wall of the housing;
(d) a sleeve fit into the housing having an inner wall processed straight in its axial direction;
(e) a rotary shaft extending through the sleeve and being supported as a journal by the sleeve;
(f) a groove formed on part of the shaft so that the groove faces the inner wall of sleeve;
(g) a tapered section formed on the shaft end facing the bottom face of the housing;
(h) a rotor having a magnet opposite to the stator;
(i) oil provided in the space between the shaft and sleeve, and retained in the groove as well as in the space formed by the tapered section, the bottom face of the housing and the sleeve.

The foregoing construction allows the oil to pool in the groove on the shaft and in the tapered section. The inner wall of the sleeve thus can be processed straight in the axial direction. In other words, the narrowed bearing can be processed with ease.

Since the oil is expected to pool in the groove and tapered section, the oil can be supplied anytime to the space between the inner wall of sleeve and the outer wall of shaft even if the oil splashes or flows out from the groove by centrifugal force. The oil supplied to the space between the inner wall of sleeve and the outer wall of the shaft has a surface tension greater than that of the oil pooled in the groove on the shaft and in the tapered section, whereby the oil is prevented from spilling out from the bearing.

The cooling device of the present invention comprises the following elements:

(a) a frame having an opening on a first face and being mountable with a heating element on a second face;

(b) a housing formed on the first face on the frame and having an opening in one direction;

(c) a stator secured on an outer wall of the housing;

(d) a sleeve fit into the housing having an inner wall thereof processed straight in its axial direction;

(e) a rotary shaft extending through the sleeve and being supported as a journal by the sleeve;

(f) a groove formed on part of the shaft so that the groove faces the inner wall of the sleeve;

(g) a tapered section formed on the shaft end facing a bottom face of the housing;

(h) a rotor having a magnet opposite to the stator;

(i) a fan secured to the rotor; and (j) oil provided in the space between the shaft and sleeve, and retained in the groove as well as in the space formed by the tapered section, the bottom face of the housing and the sleeve.

The construction discussed above allows the heat produced by a heating element secured on the frame to travel through the frame straightforwardly and dissipate from the frame surface. The rotor spins the fan to draw air from the frame opening, and produces airflow. The airflow hits the frame to dissipate the heat. An efficient cooling device is thus realized.

DESCRIPTION OF THE PREFERRED EMBODIMENT

An exemplary embodiment of the present invention is described hereinafter with reference to FIGS. 1, 2 and 3.

Figure 1:
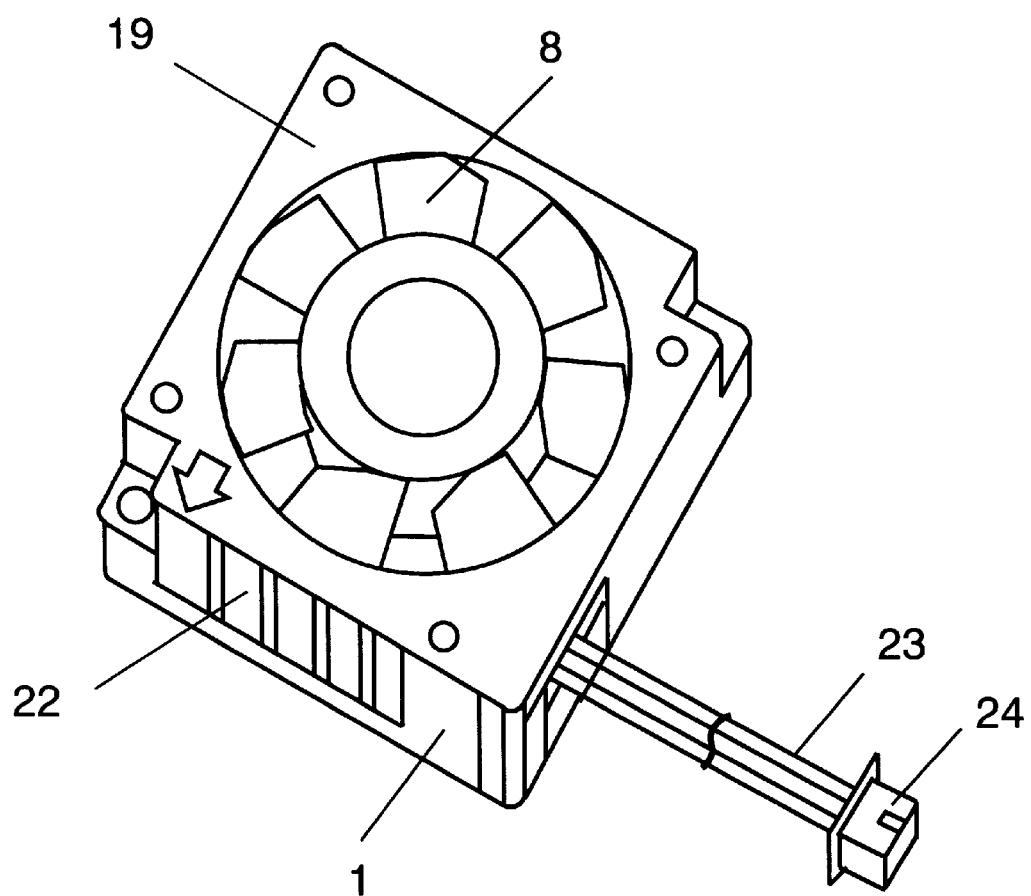
FIG. 1 is a perspective view of a cooling device in accordance with an exemplary embodiment of the present invention.

FIG. 1 is a perspective view of a cooling device in accordance with the exemplary embodiment of the present invention.

In FIG. 1, the cooling device secures a semiconductor device 300 forming a heating load, e.g. a CPU, underneath the bottom face of metal frame 1. The heat generated by the semiconductor device 300 travels to the frame 1. The cooling device draws air from the top opening by rotating fan 8, and discharges the air through openings 22 provided on a side wall of frame 1. Airflow produced by the draw and discharge operations travels on the inner face of frame 1 and goes out from openings 22 of the side wall so that the heat within frame 1 can be efficiently dissipated. Bell-mouth 19 mounted around the top opening promotes the airflow. A first terminal of lead-wire 23 is coupled to a driving-circuit-substrate disposed in frame 1 through a hole or a notch provided on the side wall of frame 1. A second terminal of lead-wire 23 is connected to connector 24 that is coupled to a power supply (not shown) and a controller (not shown). The power supply drives this cooling device, and the controller exchanges control information between the controller and cooling device.

Figure 2:
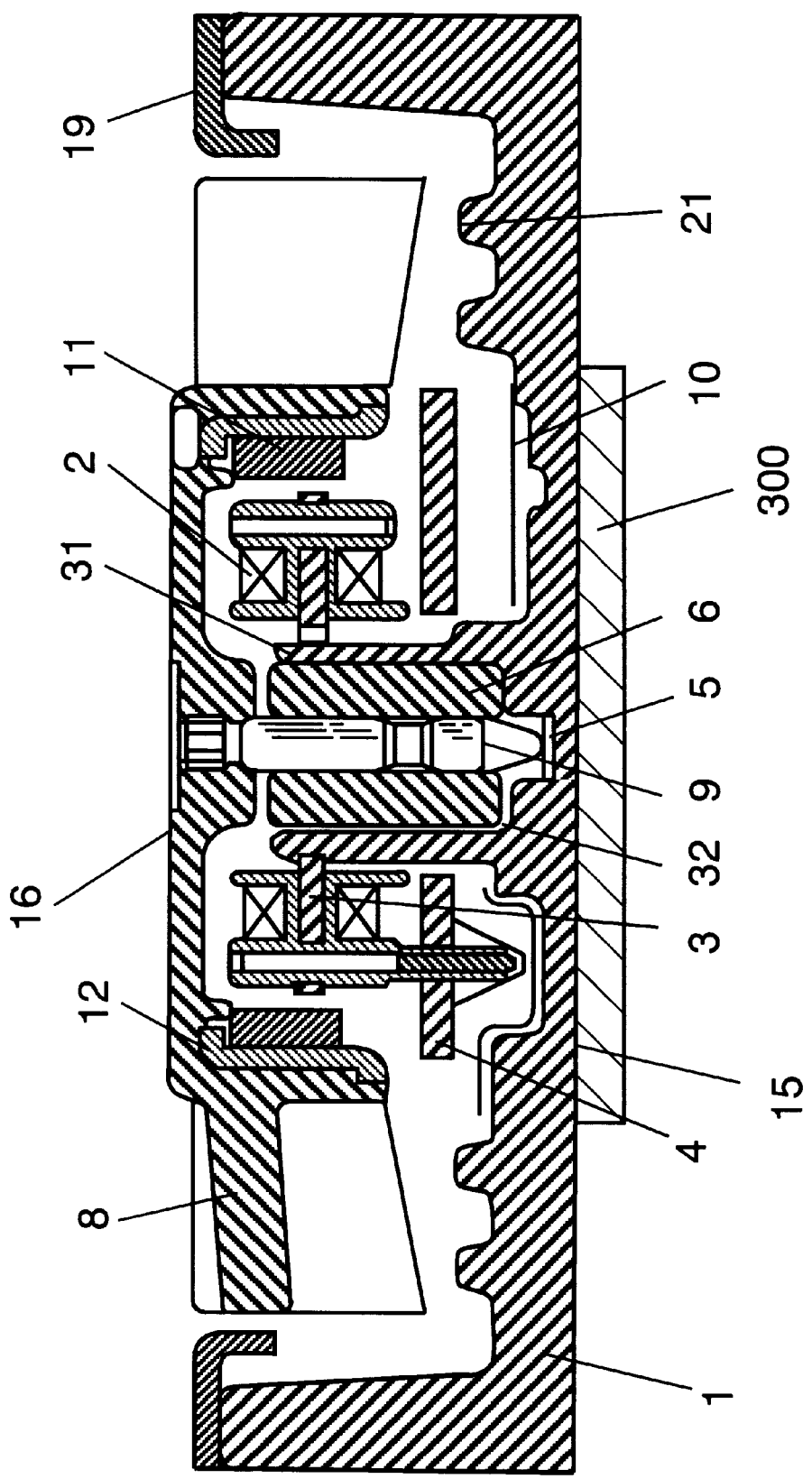
FIG. 2 is a cross section of the cooling device in accordance with the exemplary embodiment of the present invention.

FIG. 2 is a cross section of the cooling device in accordance with the exemplary embodiment of the present invention. FIG. 3 is a cross section depicting a bearing of a motor employed in the cooling device in FIG. 2.

Housing 31 having one open side and shaped in a cup is protrusively formed in a recess of frame 1. Housing 31 secures stator 3 on its outer wall, and stator 3 is wound with coil 2. Driving-circuit-substrate 4 is disposed around housing 31. Substrate 4 holds stator 3 and connects electrically a terminal of coil 2 to a wiring formed on substrate 4 by soldering. Substrate 4 is equipped with electronic components constituting the driving circuit and Hall elements detecting a rotational position of rotor 16. Insulating sheet 10 is disposed between substrate 4 and frame 1. Fins 21, shaped as a plate, an arc or a pin, are disposed in the recess of frame 1.

Frame 1 is surrounded by a side wall and has an upward opening. Bell-mouth 19 is disposed around the opening to promote airflow. Frame 1 is equipped with a given number of openings (marked with numeral 22 in FIG. 1) having a given size on the side wall, and these openings conduct air in a given direction. The bottom face of frame 1 has a flat region underneath which heating elements, e.g. semiconductor device 300, can be mounted. Frame 1 and fins 21 are made of metal materials of high thermal conductivity, such as aluminum, brass and copper, so that thermal conductivity from the heating elements to the frame and fins as well as the heat-dissipation-efficiency can be boosted.

The bottom of cup-shaped housing 31 is recessed so that a step is provided. Thrust plate 5 made of resin is disposed at the bottom of the recessed section. Sleeve 6 is inserted into housing 31 and situated on the step. Ventilating groove 32 is provided on the inner wall of housing 31 extending from top to bottom between housing 31 and sleeve 6. The step provided in housing 31 can pool oil in the recessed section.

Stator unit 15 is structured as discussed above and comprises frame 1, housing 31, sleeve 6, coil 2 and stator 3.

Rotary shaft 9 measures 1.5 mm across, extends through sleeve 6, is supported axially by thrust plate 5, and is rotatably supported by sleeve 6. Shaft 9 is provided with a unitary fan 8. Magnet 11 is bonded to fan 8 via magnet yoke 12 so that magnet 11 faces annular stator 3. Rotor 16 is structured as discussed above and comprises magnet 11, yoke 12 and fan 8.

The bearing of the motor is detailed hereinafter with reference to FIG. 3.

Figure 3:
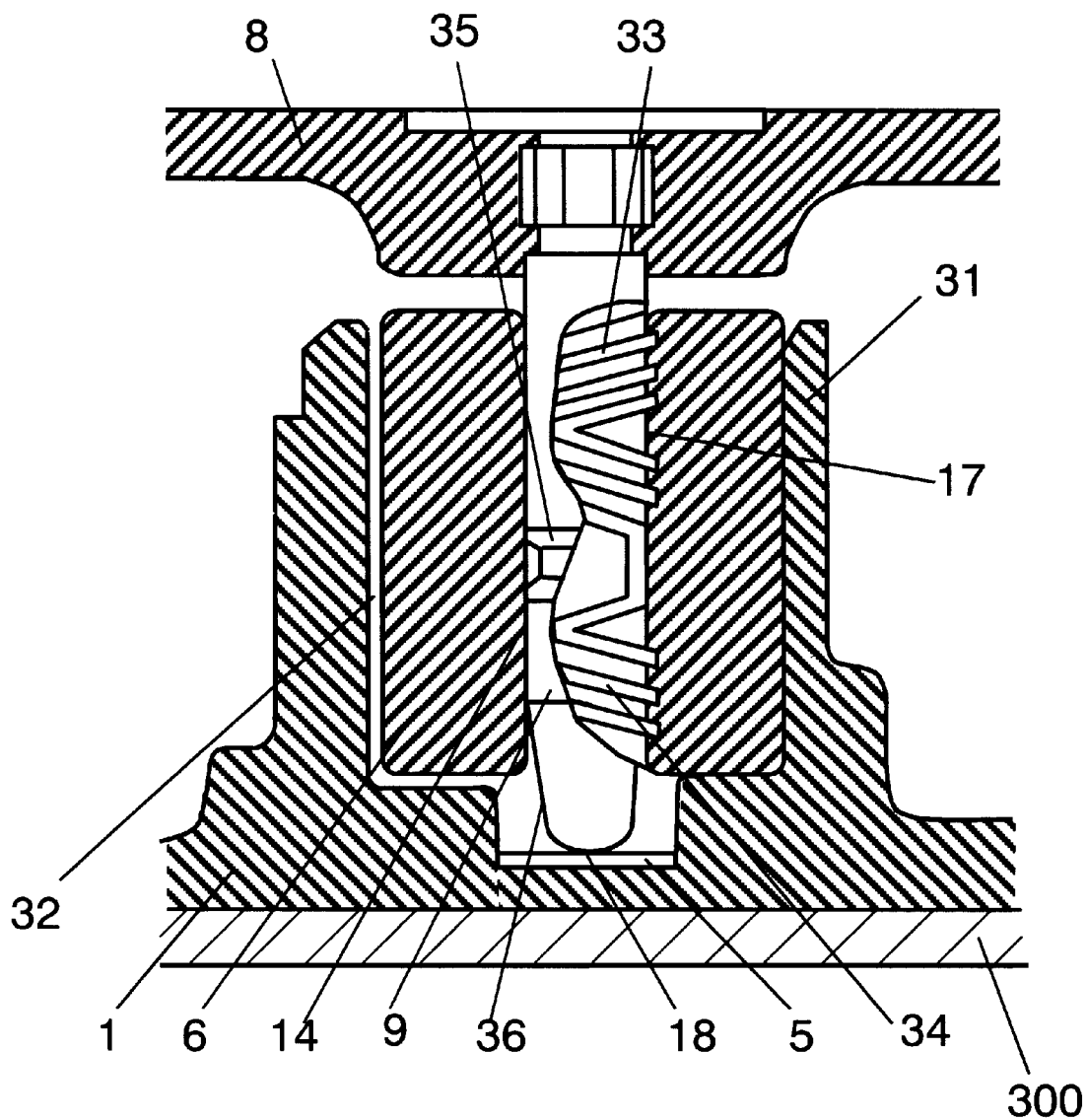
FIG. 3 is a cross section depicting a bearing of a motor employed in the cooling device in accordance with the exemplary embodiment of the present invention.
Figure 4:
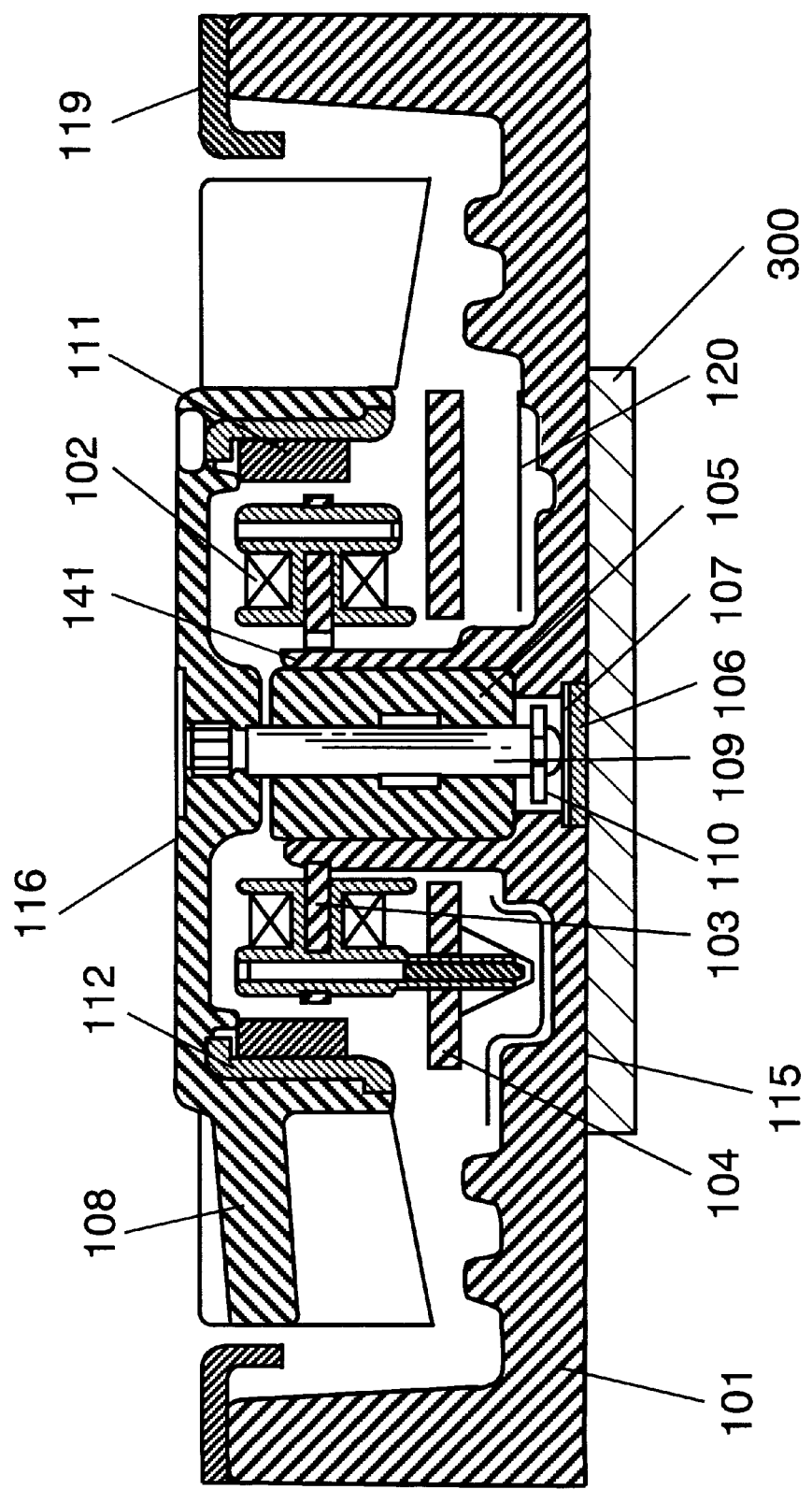
FIG. 4 is a cross section depicting a conventional cooling fan for semiconductor devices.

In FIG. 3, the inner wall of sleeve 6 is processed straight in its axial direction except for both edges of the wall, which are chamfered by 0.1 mm. The processed inner wall surface undergoes a ball-rolling process, whereby first dynamic-pressure-generating grooves 33 and second dynamic-pressure-generating grooves 34 are formed on the inner wall surface. The grooves 33 and 34 are herring-bone shaped so that oil is retained therein. The rotation of shaft 9 moves the oil along grooves 33 and 34 to the center portions thereof, thereby producing a pumping force. Shaft 9 is thus centered at the sleeve and journaled by the sleeve.

Dynamic-pressure-generating-grooves 33 and 34 are further detailed hereinafter.

Grooves 33 and 34 undergo a sizing process for removing burrs that have been produced by the ball-rolling-process so that the inner wall surface is finished as flat as having not more than ±2 $\mu$m error. The clearance between shaft 9 and sleeve 6 is determined at 2–12 $\mu$m for one side each. Oil 14 is lubricated to grooves 33 and 34 as a lubricant for shaft 9 and sleeve 6. Radial bearing 17 is structured as discussed above, and sleeve 6 journals shaft 9 and allows shaft 9 to rotate arbitrarily. Grooves 33 and 34 can be formed on the outer wall of shaft 9 instead of on the inner wall of sleeve 6.

Annular recess 35 is formed on part of shaft 9 so that annular recess 35 faces the inner wall of sleeve 6. In this exemplary embodiment, annular recess 35 is formed on the part of shaft 9 with a depth of ca 0.1 mm, which part faces the middle portion between grooves 33 and 34. The middle portion does not contribute to generating the dynamic-pressure. Both the ends of annular recess 35 lead to the outer wall of shaft 9 at an angle of 5–45° with regard to the axial direction. Annular recess 35 accepts surplus oil 14 that is supposed to be retained by grooves 33 and 34.

The end of shaft 9 facing to the bottom face of housing 31 tapers toward the bottom face of housing 31 to form a tapered section 36. To be more specific, section 36 is tapered at an angle of 5–30° with regard to the axial direction of shaft 9.

The tip of tapered section 36 is processed to be spherical and contacts thrust plate 5 so that thrust plate 5 supports shaft 9 in the axial direction, whereby thrust bearing 18 is constructed.

A space formed by taper section 36, the bottom face of housing 31 and sleeve 6 is lubricated with the same oil as retained in grooves 33 and 34; however, the space receives a greater amount of the oil than that in grooves 33 and 34.

Sleeve 6 is made of copper alloy specified by JIS C3604 or JIS BC6C (JIS=Japanese Industrial Standard) because the efficiencies of cutting and ball-rolling are considered. Shaft 9 is made of stainless steel specified by JIS SUS420J2 or the like because abrasion-resistance and easy-treatment are considered. Oil 14 is a heatproof oil such as fluorine synthetic fluid to withstand a high temperature, for the cooling device of the present invention often secures semiconductor devices (heating elements) directly to the frame and is thus required to resist a high temperature. Extreme-pressure-additive is added to oil 14 so that a locally concentrated extreme pressure can be moderated.

Figure 5:
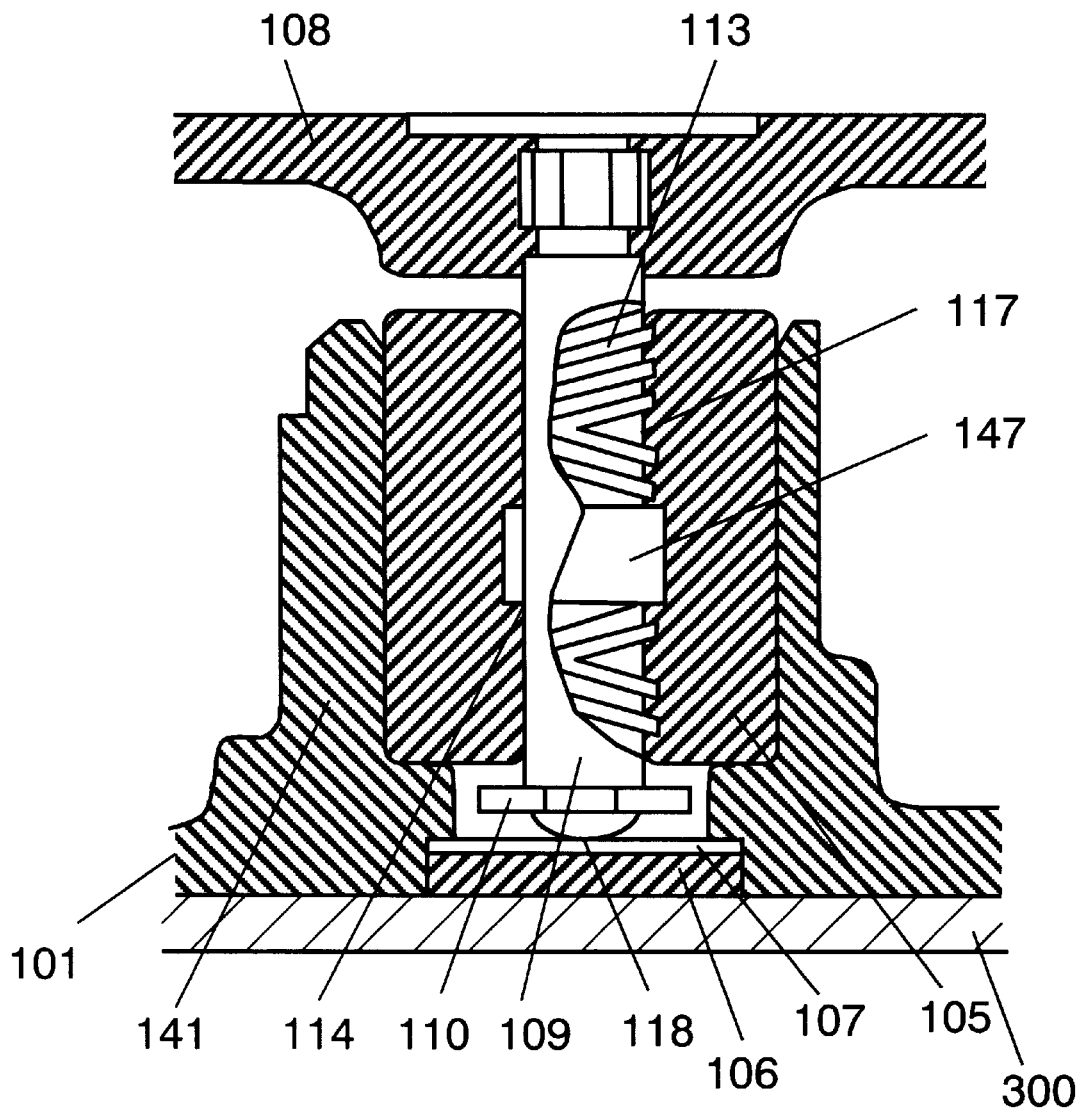
FIG. 5 is a cross section of a bearing of a motor employed in the cooling fan depicted in FIG. 4.

The construction discussed above allows oil 14 to pool in annular recess 35 formed on shaft 9 and in tapered section 36. Therefore, the inner wall of sleeve 6 can just be processed straight in the axial direction, although the prior art shown in FIG. 5 requires forming oil reservoir 107 on sleeve 106, which requires an elaborate process. Therefore, the bearing with sleeve 6 of which inner diameter measures not more than 2 mm can be processed with ease, thereby restraining the manufacturing cost from boosting. After the process, the inner wall surface is provided with dynamic-pressure-generating grooves 33 and 34 by ball-rolling. Shaft 9 extends through sleeve 6 with the diameter measuring not more than 2 mm, i.e. 1.5 mm in this exemplary embodiment.

The two oil reservoirs provided on shaft 9, i.e. annular recess 35 and tapered section 36, can absorb volume variations in the oil due to expansion or contraction, produced by temperature changes of the oil per se and the air entrapped in the oil.

Oil 14 lubricated in the bottom of housing 31 travels into a space between tapered section 36 and the inner wall of sleeve 6, and further rises because of greater surface tension. This phenomenon contributes to supplying oil anytime to groove 34 and annular recess 35 even if they would be short in oil due to oil splash by centrifugal force produced by the spin of shaft 9, or due to oil-spill over the absorptive capacity for oil-volume-variation. Oil shortage in groove 34 and annular recess 35 can thus be eliminated.

Ventilating groove 32 is formed at the fit portion between housing 31 and sleeve 6. When shaft 9 is inserted into sleeve 6, air within sleeve 6 escapes so that air-pressure of the air between the bottom of housing 31 and sleeve 6, and that of the air on the fan side above sleeve 6, become equal. As a result, shaft 9 can be inserted smoothly into sleeve 6.

The space between housing 31 and sleeve 6, i.e. the depth of groove 32, is set so narrow that oil does not flow out through groove 32 even if the cooling device is placed upside down, namely, fan 8 is placed at the bottom. In this exemplary embodiment, the space is set at not more than 0.3 mm, thereby preventing the oil from flowing out by surface tension. Groove 32 can be formed on at least one of the outer wall of sleeve 6, or the inner wall of the housing 31.

If an oil reservoir were provided around the outer wall of the shaft in the neighborhood between the upper end of sleeve 6 and fan 8, as a measure for absorbing the variation in oil volume, a large amount of oil would pool in this reservoir. The oil in the reservoir then is contacted by fan 8 placed immediately adjacent to the reservoir, and the oil is vulnerable to splashing due to centrifugal force. An oil path leading to fan 8 is formed so that the oil can travel with ease, which incurs oil shortage in an earlier time. On the other hand, the present invention provides two oil reservoirs at separate places i.e. one is annular recess 35 on shaft 9 and the other is tapered section 36. Therefore, fan 8 never touches the oil so that no oil shortage due to splashing is expected.

An operation of the cooling device of the present invention is described hereinafter.

The cooling device draws air axially from the top opening of frame 1 when the motor spins fan 8. The air travels through a path formed by fins 21 and is discharged from openings 22 provided on the side wall of frame 1. The airflow takes heat from frame 1 and fins 21 to which the heat travels from heating elements, so that cooling device functions well. The directions of openings 22 on the side wall are adaptively determined responsive to the applications intended by an apparatus employing this cooling device, such as blowing the discharged air to other heating elements or discharging the heated air from the apparatus efficiently.

The shape of fins 21 is not limited to a plate, an arc or a pin, but may be a triangle, wing, coil, circle, or a radial shape as far as the fins work in the same way and produce the same effect. When an outer dimension of the cooling device measures as small as less than 40 mm square, the motor is naturally downsized, which results in a smaller output of the motor. In this case, wind force produced by the fan becomes poor, and fins disposed in the frame block the airflow and thus reduce air capacity to be discharged. The fins therefore produce an adverse effect. In the case of employing such a small cooling device, fins are desirably omitted so that air capacity to be discharged can be increased to boost the heat dissipation effect.

The structures of cooling device, motor, and bearing as well as the kind of oil are not limited to this exemplary embodiment, but various modifications are available.

As discussed above, the present invention realizes a long-life motor, in which the bearing can be processed with ease, can be narrowed, and its oil-spill is prevented. The present invention also provides a small-sized cooling fan employing this motor, which cooling fan operates efficiently with less noise.

What is claimed is:

1. A motor comprising:

a frame;

a housing disposed in said frame;

a stator secured to an outer wall of said housing;

a sleeve situated in said housing, and an inner wall thereof extending straight in an axial direction of said sleeve;

a rotary shaft extending through said sleeve and being rotatably supported by said sleeve;

a rotor having a magnet opposite to said stator; and no more than two recessed portions on said shaft forming oil reservoirs and having oil provided therein, said two recessed portion comprising an annular recess formed on a central part of said shaft an facing said inner wall of said sleeve and a tapered section formed on an end of said rotary shaft facing a bottom face of said housing; and wherein a first of said oil reservoirs is formed by said end of said tapered section, said bottom face of said housing and said sleeve, and a second of said oil reservoirs is formed between said annular recess and said inner wall of said sleeve.

2. The motor as defined in claim 1, wherein the shaft end facing the bottom face of said housing is supported by a thruster disposed on the bottom face of said housing.

3. The motor as defined in claim 1, wherein a dynamic-pressure-generating-groove for retaining said oil and for generating dynamic-pressure by spinning is formed on one of an outer wall of said shaft and the inner wall of said sleeve.

4. The motor as defined in claim 3, wherein said dynamic-pressure-generating-groove comprises a first dynamic-pressure-generating-groove and a second dynamic-pressure-generating-groove, and wherein said annular recess formed on part of said shaft is situated between said first and second dynamic-pressure-generating-grooves.

5. The motor as defined in claim 1, wherein said frame has an opening and a groove extending from the opening to the bottom face of said housing is formed on at least one of an inner wall of said housing and the outer wall of said sleeve.

6. The motor as defined in claim 1, wherein said shaft, with a diameter of not more than 2 mm, extends through said sleeve.

7. The motor as defined in claim 1, wherein said tapered section is formed such that an outer diameter of said shaft narrows toward the bottom face of said housing.

8. The motor of claim 1, wherein said sleeve has an inner diameter of not more than 2 mm.

9. A cooling device comprising:

a frame;

a housing disposed in said frame;

a stator secured to an outer wall of said housing;

a sleeve situated in said housing, and having an inner wall thereof extending straight in an axial direction of the sleeve;

a rotary shaft extending through said sleeve and being rotatably supported by said sleeve;

a rotor having a magnet opposite to said stator;

a fan secured to said rotor; and no more than two recessed portions on said shaft forming oil reservoirs and having oil provided therein, said two recessed portions comprising an annular recess formed on a central part of said shaft and facing said inner wall of said sleeve and a tapered section formed on an end of said rotary shaft facing a bottom face of said housing;

wherein a first of said oil reservoirs is formed by said end of said tapered section, said bottom face of said housing and said sleeve, and a second of said oil reservoirs is formed between said annular recess and said inner wall of said sleeve.

10. The cooling device as defined in claim 1, wherein said frame has a first face having said housing disposed thereon and a fin is provided on the first frame face where said housing is disposed.

11. The cooling device as defined in claim 1, wherein said frame has an opening to said first face, a side wall surrounding said housing, and at least one additional opening provided on the side wall.

12. The cooling device as defined in claim 1, wherein said shaft, with a diameter of not more than 2 mm, extends through said sleeve.

13. The cooling device as defined in claim 1, wherein said frame has a second face having a heating element mounted thereon.

14. The motor of claim 9, wherein said sleeve has an inner diameter of not more than 2 mm.

15. A cooling device comprising:

a frame having a first opening surrounded by a side wall on a first face of said frame, and being mountable with a heating element on a second face;

a housing disposed on the first face of said frame;

a stator secured to an outer wall of said housing;

a sleeve situated in said housing, and having an inner wall thereof extending straight in an axial direction of said sleeve;

a rotary shaft extending through said sleeve and being rotatably supported by said sleeve;

a dynamic-pressure-generating-groove formed on one of the inner wall of said sleeve and an outer wall of said shaft;

a rotor having a magnet opposite to said stator;

at least one second opening provided on said side wall of said frame;

a fin provided on said first frame face on which said housing is disposed;

a fan secured to said rotor; and no more than two recessed portions on said shaft forming oil reservoirs and having oil provided therein, said two recessed portions comprising an annular recess formed on a central part of said shaft and facing said inner wall of said sleeve and a tapered section formed on an end of said rotary shaft facing a bottom face of said housing;

wherein a first of said oil reservoirs is formed by said end of said tapered section, said bottom face of said housing and said sleeve, and a second of said oil reservoirs is formed between said annular recess and said inner wall of said sleeve.

16. The cooling device as defined in claim 15, wherein a groove extending from the opening to the bottom face of said housing is formed on at least one of an inner wall of said housing and the outer wall of said sleeve.

17. The cooling device as defined in claim 15, wherein a rotary shaft end facing the bottom face of said housing is supported by a thruster disposed on the bottom face of said housing.

18. The cooling device as defined in claim 15, wherein an inner diameter of said sleeve measures not more than 2 mm.

19. The cooling device as defined in claim 15, wherein said shaft, with a diameter of not more than 2 mm, extends through said sleeve.

20. The cooling device as defined in claim 15, wherein said tapered section is formed such that an outer diameter of said shaft narrows toward the bottom face of said housing.

21. The motor of claim 15, wherein said sleeve has an inner diameter of not more than 2 mm.

* * * * *